(12) United States Patent
Conway

(10) Patent No.: US 7,971,121 B1
(45) Date of Patent: Jun. 28, 2011

(54) SYSTEMS AND METHODS FOR PROVIDING DISTRIBUTED PACKET LOSS CONCEALMENT IN PACKET SWITCHING COMMUNICATIONS NETWORKS

(75) Inventor: Adrian Evans Conway, Weston, MA (US)

(73) Assignee: Verizon Laboratories Inc., Waltham, MA (US)

( * ) Notice: Subject to any disclaimer, the term of this patent is extended or adjusted under 35 U.S.C. 154(b) by 1093 days.

(21) Appl. No.: 10/871,944

(22) Filed: Jun. 18, 2004

(51) Int. Cl.
*H04L 12/50* (2006.01)
*H04J 3/24* (2006.01)
*G06F 11/00* (2006.01)

(52) U.S. Cl. .......................... 714/747; 370/360; 370/474

(58) Field of Classification Search .................. 370/360, 370/473; 704/219, 258; 714/776; 375/E7.281; 709/231
See application file for complete search history.

(56) References Cited

U.S. PATENT DOCUMENTS

| | | | | |
|---|---|---|---|---|
| 5,526,366 A * | 6/1996 | Jarvinen et al. | ............... | 714/747 |
| 5,918,002 A * | 6/1999 | Klemets et al. | ................. | 714/18 |
| 5,943,347 A * | 8/1999 | Shepard | ......................... | 714/747 |
| 5,968,197 A * | 10/1999 | Doiron | ........................... | 714/748 |
| 6,230,296 B1 * | 5/2001 | Hanko et al. | .................. | 714/748 |
| 6,357,028 B1 * | 3/2002 | Zhu | ............................... | 714/751 |
| 6,421,802 B1 * | 7/2002 | Schildbach et al. | .......... | 714/747 |
| 6,597,961 B1 * | 7/2003 | Cooke | ............................... | 700/94 |
| 6,674,760 B1 * | 1/2004 | Walrand et al. | ............... | 370/411 |
| 6,851,084 B2 * | 2/2005 | Pattavina | ...................... | 714/776 |
| 6,973,425 B1 * | 12/2005 | Kapilow | ......................... | 704/228 |
| 7,013,267 B1 * | 3/2006 | Huart et al. | .................... | 704/207 |
| 7,031,926 B2 * | 4/2006 | Makinen et al. | .............. | 704/500 |
| 7,039,117 B2 * | 5/2006 | Chan | .......................... | 375/240.27 |
| 7,127,399 B2 * | 10/2006 | Hama et al. | ................. | 704/270.1 |
| 7,363,569 B2 * | 4/2008 | Pendakur et al. | ............. | 714/748 |
| 7,529,673 B2 * | 5/2009 | Makinen et al. | .............. | 704/265 |
| 2002/0152440 A1 * | 10/2002 | Yona et al. | ..................... | 714/746 |
| 2005/0015703 A1 * | 1/2005 | Terry et al. | ..................... | 714/776 |
| 2007/0016837 A1 * | 1/2007 | Candes et al. | ................ | 714/746 |

FOREIGN PATENT DOCUMENTS

WO WO 03/017561 A1 * 2/2003

OTHER PUBLICATIONS

Moon-Keun Lee et al.: "A Packet Loss Concealment Algorithm Based on Time-Scale Modification for CELP-type Speech Coders," 2003 IEEE, ICASSP; pp. I-116-I-119.
Emre Gündüzhan et al.: "A Linear Prediction Based Packet Loss Concealment Algorithm for PCM Coded Speech," IEEE Transactions on Speech and Audio Processing, vol. 9, No. 8; Nov. 2001; pp. 778-785.
Colin Perkins et al.: "A Survey of Packet Loss Recovery Techniques for Streaming Audio," IEEE Network; Sep./Oct. 1998; pp. 40-48.
"Packet Loss and Packet Loss Concealment," Nortel Networks Technical Brief; pp. 1-3.

(Continued)

*Primary Examiner* — Dang T Ton
*Assistant Examiner* — Ryan C Kavleski

(57) ABSTRACT

A communications system (100) includes a packet switching network (130) configured to transfer a stream of information packets from a source (110) to a destination (120). The communications system (100) also includes at least one loss concealment processor (140) configured to perform packet loss concealment on the stream of information packets as the stream passes through an intermediate point within the packet switching network (130).

18 Claims, 3 Drawing Sheets

OTHER PUBLICATIONS

International Telecommunication Union Recommendation G.729: "General Aspects of Digital Transmission Systems," Mar. 1996; 39 pages.

Fure-Ching Jeng et al.: "Concealment of Bit Error and Cell Loss in Inter-frame Coded Video Transmission," IEEE International Conference on Communications on Jun. 23-26, 1991; pp. 496-500, vol. 1.

Ju Yong Park et al.: "A Simple Concealment for ATM Bursty Cell Loss," IEEE Transactions on Consumer Electronics, vol. 39, No. 3; Jun. 11, 1993; pp. 704-710.

D. Raychaudhuri et al.: "ATM Transport and Cell-Loss Concealment Techniques for MPEG Video," IEEE International Conference on Acoustics, Speech, and Signal Processing on Apr. 27-30, 1993; pp. I-117-I-120, vol. 1.

Jian Feng et al.: "Cell Loss Concealment Method for MPEG Video in ATM Networks," IEEE Global Telecommunications Conference on Nov. 13-17, 1995; vol. 3; pp. 1925-1929.

H. Sanneck et al.: "A New Technique for Audio Packet Loss Concealment," IEEE Global Telecommunications Conference on Nov. 18-22, 1996; pp. 48-52.

S. Shirani et al.: "Packet Loss Concealment in Baseline JPEG Coded Images," IEEE Symposium on Advances in Digital Filtering and Signal Processing on Jun. 5-6, 1998; pp. 16-19.

M. Hasan et al.: "A Cascaded Map-Based Linear Prediction (CMAP-LP) Error Concealment Technique for Consecutive Block Losses," IEEE International Symposium on Circuits and Systems on May 6-9, 2001; pp. II-329-II-332, vol. 2.

Ming-Yang Cheng et al.: "A Nurbs-Based Error Concealment Technique for Corrupted Images From Packet Loss," International Conference on Image Processing on Sep. 22-25, 2002; pp. II-705-II-708, vol. 2.

Benjamin W. Wah et al.: "Loss Concealments of Subband Coded Images for Real-Time Transmissions in the Internet," IEEE International Conference on Multimedia and Expo on Aug. 26-29, 2003; pp. 449-452, vol. 2.

Jonas Lindblom et al.: "Packet Loss Concealment Based in Sinusoidal Extrapolation," IEEE International Conference on Acoustics, Speech, and Signal Processing on May 13-17, 2002; pp. I-173-I-176, vol. 1.

C.S. Xydeas et al.: "Model-Based Packet Loss Concealment for AMR Coders," IEEE International Conference on Acoustics, Speech, and Signal Processing on Apr. 6-10, 2003; pp. I-112-I115, vol. 1.

Christoffer A. Rødbro et al.: "Compressed Domain Packet Loss Concealment of Sinusoidally Coded Speech," IEEE International Conference on Acoustics, Speech, and Signal Processing on Apr. 6-10, 2003; pp. I-104-I-107, vol. 1.

Jonas Lindblom et al.: "Error Protection and Packet Loss Concealment Based on a Signal Matched Sinusoidal Vocoder," IEEE International Conference on Acoustics, Speech, and Signal Processing on Apr. 6-10, 2003; pp. I-100-I-103, vol. 1.

Masahiro Wada: "Selective Recovery of Video Packet Loss Using Error Concealment," IEEE Journal on Selected Areas in Communications; vol. 7, Issue 5; Jun. 1989; pp. 807-814.

Mohammad Ghanbari et al.: "Cell-Loss Concealment in ATM Video Codecs," IEEE Transactions on Circuits and Systems for Video Technology; vol. 39, No. 3; Jun. 1993; pp. 238-247.

Liem H. Kieu et al.: "Cell-Loss Concealment Techniques for Layered Video Codecs in an ATM Network," IEEE Transactions on Image Processing, vol. 3, No. 5; Sep. 1994; pp. 666-677.

Jian Zhang et al.: "A Cell-Loss Concealment Technique for MPEG-2 Coded Video," IEEE Transactions on Circuits and Systems for Video Technology, vol. 10, No. 4; Jun. 2000; pp. 659-665.

* cited by examiner

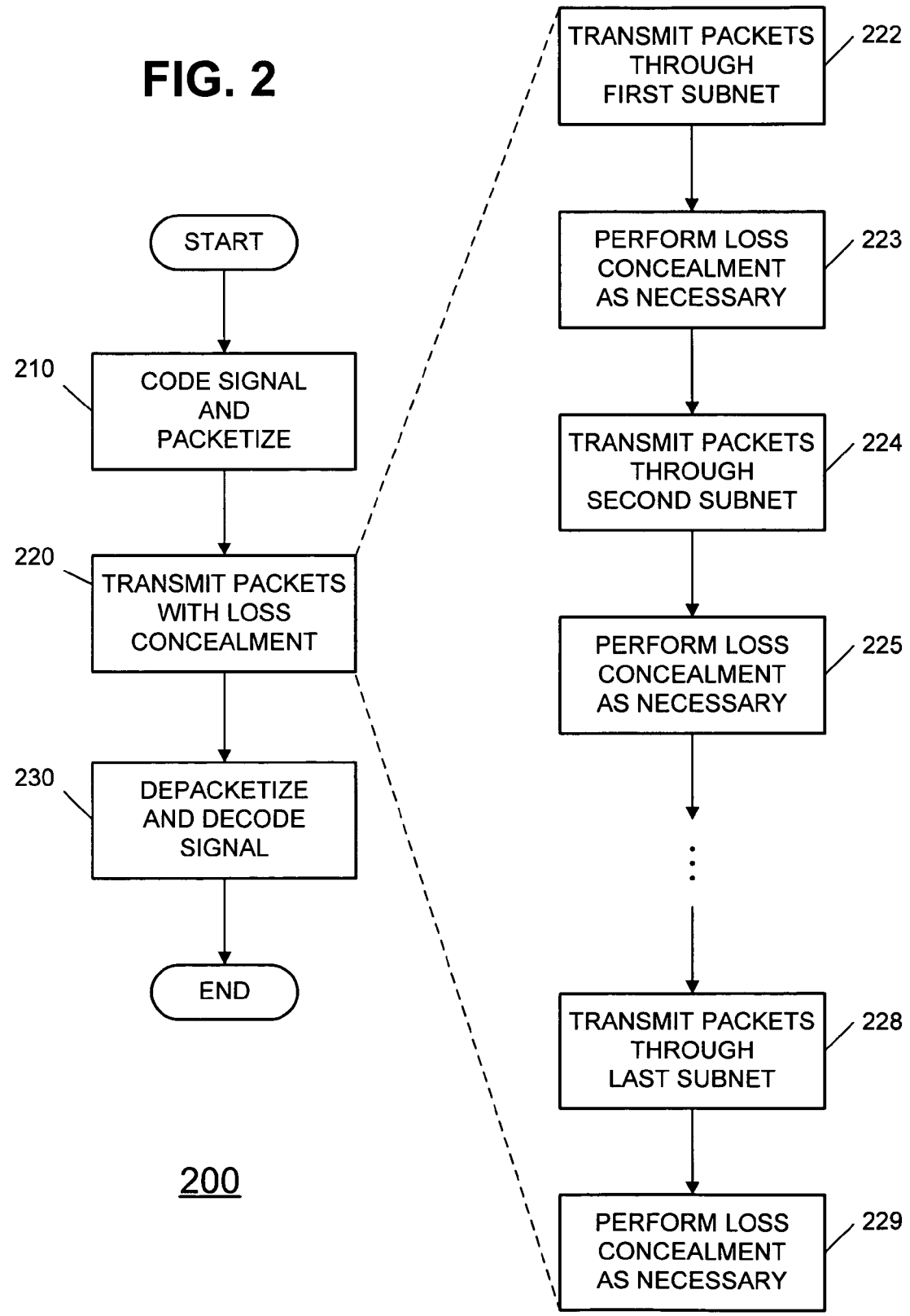

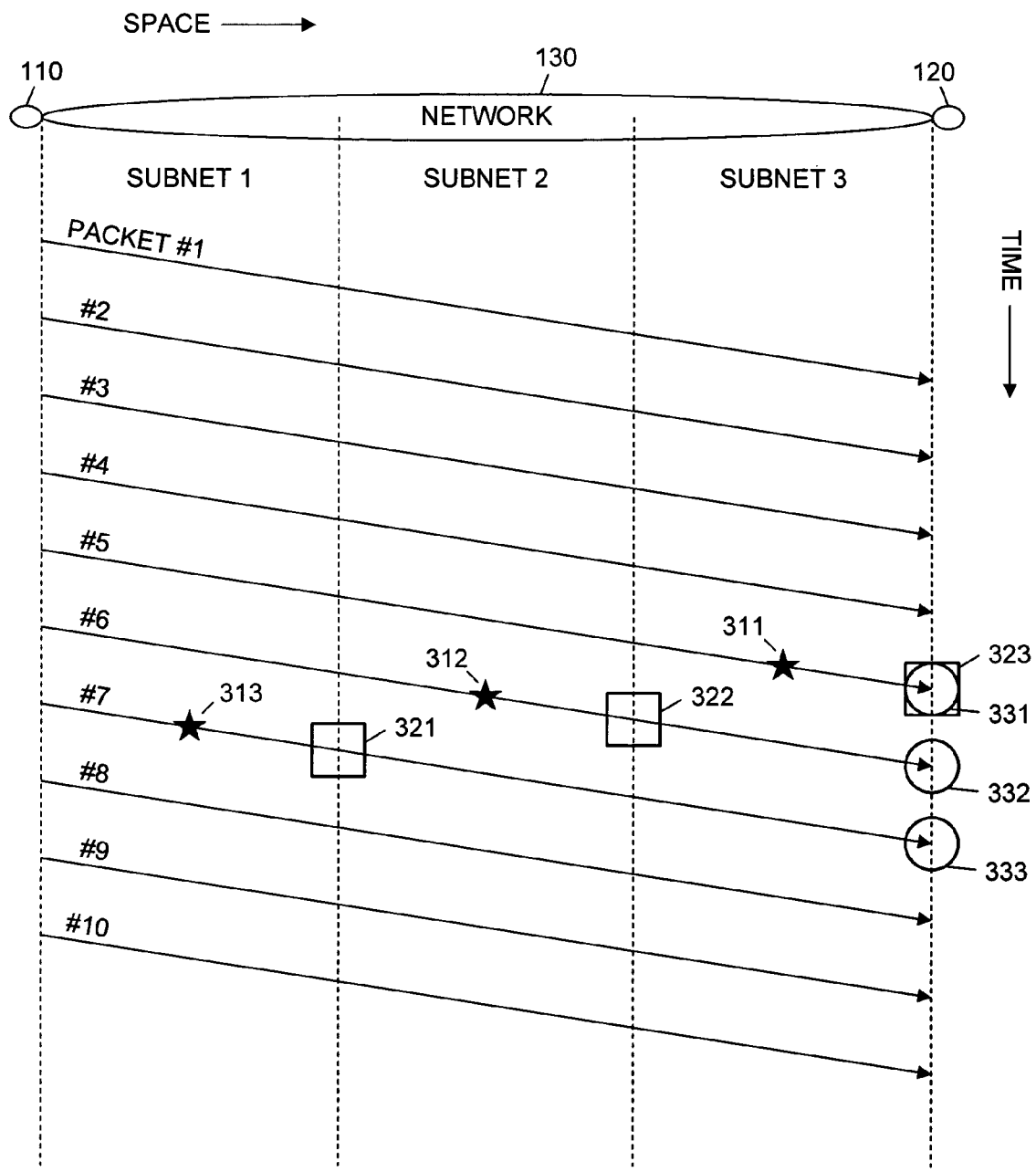

SYSTEMS AND METHODS FOR PROVIDING DISTRIBUTED PACKET LOSS CONCEALMENT IN PACKET SWITCHING COMMUNICATIONS NETWORKS

BACKGROUND OF THE INVENTION

A. Field of the Invention

The present invention relates generally to electronic communications and, more particularly, to packet loss concealment in packet switching communications networks.

B. Description of the Related Art

Today, real-time telecommunication signals (e.g., voice, video, audio, data, and multimedia) are increasingly transported via packet switching networks. For example, Internet applications now routinely packetize voice, video, and audio signals and periodically transmit, or stream, the resulting data packets from source to destination. However, when such packetized streams traverse a packet switching network such as the Internet, some of the transmitted packets may be corrupted or lost. For example, packets are sometimes corrupted through bit errors in transmission and packets are sometimes dropped or discarded due to traffic congestion at buffer pools in network switches or routers. Such corrupted and dropped packets constitute loss of information and thus degrade the quality of transmitted signals as perceived by end users.

To improve quality of reception and perception, various error correction and packet loss concealment schemes have been devised. Whereas error correction techniques attempt to fix bit errors or bit erasures in a received signal, packet loss concealment techniques attempt to mask or camouflage missing packets in a received signal by generating and substituting replacement packets when the signal is presented to the end user at the signal destination. Basic packet loss concealment methods simply attempt to replace missing information with information from previous packets, while more sophisticated loss concealment methods synthesize replacement information based on previously received information and/or knowledge of the signal source.

Generally, known loss concealment methods provide acceptable levels of perceptual quality (e.g., toll quality for signals transmitted by commercial providers for paying customers) when packet losses are relatively few and far between. However, when packet loss rates increase (e.g., due to network congestion and/or channel degradation), or when bursts of consecutive packet loss occur, known loss concealment methods can fail to provide acceptable signal quality.

Consequently, a need exists for improved forms of packet loss concealment.

SUMMARY OF THE INVENTION

Systems and methods consistent with the present invention address this and other needs by applying packet loss concealment techniques, not only at a signal destination, but also at one or more intermediate points in a network path between a signal source and a signal destination.

In accordance with the purpose of the invention as embodied and broadly described herein, an exemplary communications system includes at least one loss concealment processor configured to perform packet loss concealment on a stream of information packets as the stream passes through an intermediate location within a packet switching network.

In another implementation consistent with the present invention, a method of communicating information from a source to a destination includes: transmitting a stream of information packets from the source to an intermediate location; performing packet loss concealment on the stream of information packets, at the intermediate location, to form an intermediate stream of information packets; transmitting the intermediate stream of information packets from the intermediate location to the destination; and performing packet loss concealment on the intermediate stream of information packets at the destination.

In yet another implementation consistent with the present invention, a packet switching node for use in a packet switching network includes: an input interface configured to receive streams of information packets from a plurality of communications sources; an output interface configured to selectively transmit the streams of packets to a plurality of communications destinations; and a loss concealment processor configured to perform packet loss concealment on the streams of packets as they pass through the packet switching node.

In yet another implementation consistent with the present invention, a computer readable medium includes a plurality of instructions that, when executed by components in a communications system, cause the communications system to perform distributed packet loss concealment, the computer readable medium comprising: instructions for transferring a stream of information packets from a source device, through a series of intermediate nodes, to a destination device; and instructions for performing packet loss concealment on the stream of information packets as the stream passes through at least one of the intermediate nodes.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 2 depicts an exemplary packet transmission and loss concealment scheme consistent with implementations of the present invention; and FIG. 3 depicts an exemplary packet loss scenario, contrasting the performance of a conventional packet loss concealment scheme with that of an exemplary loss concealment scheme consistent with implementations of the present invention.

DETAILED DESCRIPTION

Figure 1:
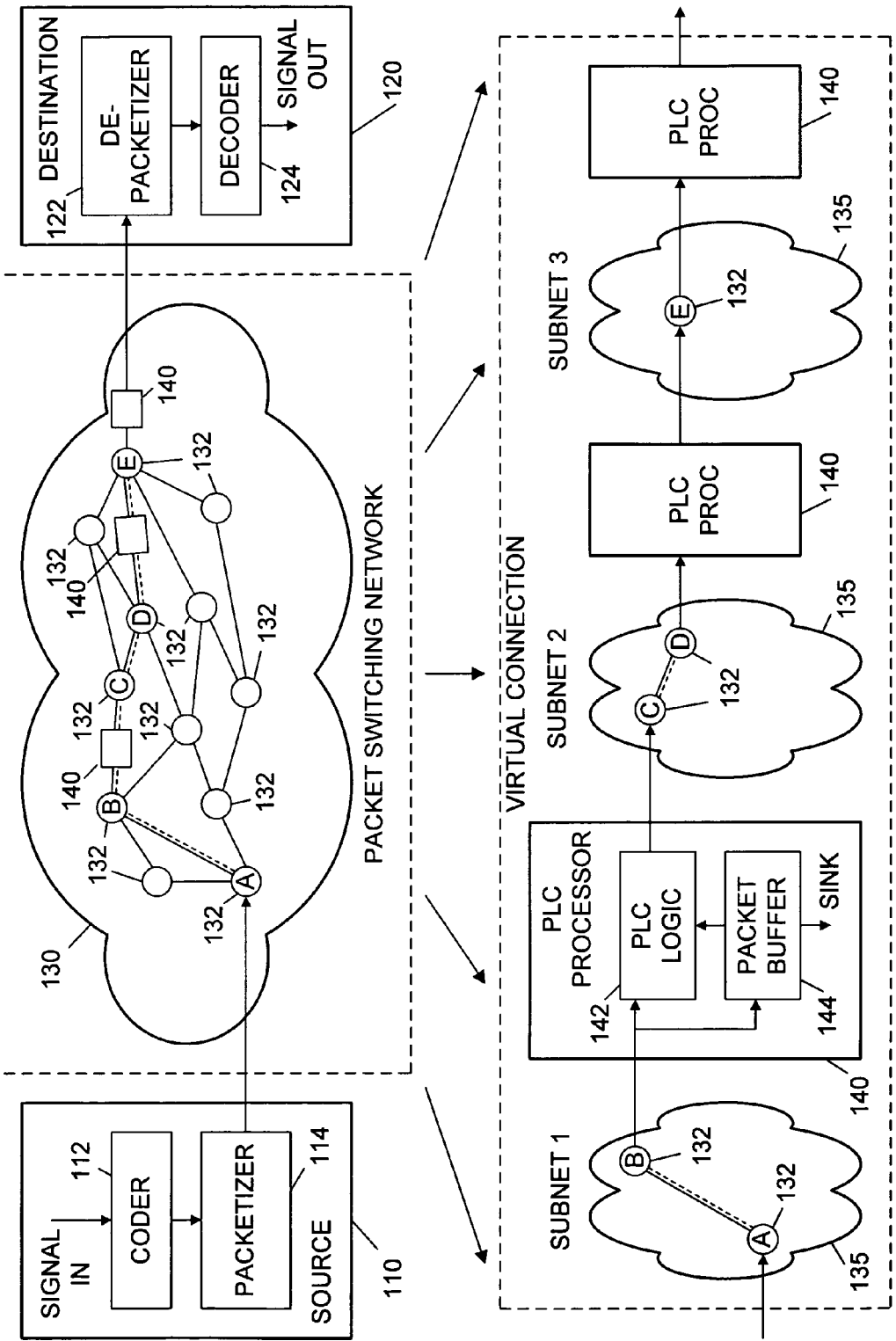
FIG. 1 depicts an exemplary packet switching communications system consistent with implementations of the present invention.

The following detailed description of the invention refers to the accompanying drawings. The same reference numbers in different drawings may identify the same or similar elements. Also, the following detailed description does not limit the invention. Rather, the scope of the invention is defined by the appended claims and equivalents.

Generally, systems and methods consistent with the present invention employ distributed packet loss concealment. More specifically, exemplary embodiments of the invention apply loss concealment, not only at a signal destination, but also at one or more intermediate points within a packet switching network situated between a signal source and a signal destination.

At each such intermediate point, lost packets (i.e., packets failing to reach the intermediate point in a timely fashion) may be replaced with substitute packets constructed using knowledge of packets previously received at the intermediate point and/or knowledge of the signal source. Consequently, and as is made clear hereinafter, embodiments of the present invention are generally able to use more original signal information in repairing missing signal segments than do conventional schemes employing loss concealment exclusively at a signal destination.

Systems and methods consistent with the present invention thus improve end-to-end perceptual signal quality as compared with conventional implementations.

Exemplary System

FIG. 1 depicts an exemplary packet switching communication system 100 consistent with implementations of the present invention. As shown in the upper portion of FIG. 1, system 100 includes a source device 110, including a signal coder 112 and a signal packetizer 114, as well as a destination device 120, including a signal depacketizer 122 and a signal decoder 124. System 100 also includes a packet switching network 130, including a plurality of packet switching nodes 132. As shown in the lower portion of FIG. 1, nodes 132 can, according to the invention, be selectively grouped to form logical sub-networks 135, an output of each such sub-network 135 being coupled to a respective one of a plurality of packet loss concealment (PLC) processors 140. Each of PLC processors 140 can include a PLC logic unit 142 and a packet buffer 144 (though, to minimize clutter in FIG. 1, only one of PLC processors 140 is shown to include such elements).

Source device 110 can be any known device capable of generating or otherwise providing a stream of information packets for conveyance via a packet switching communication channel. For example, source device 110 can be a personal computer, a mainframe computer, a network server, a dedicated audio/video device, a digital telephone, etc. Accordingly, source device 110 can include components, such as coder 112 and packetizer 114, configured to convert an analog source signal (e.g., a voice signal, audio signal, video signal, etc.) into an encoded packet stream.

Coder 112 can be any useable signal coder. For example, for voice signals, coder 112 can be compatible with any of the well known voice codecs defined by the International Telecommunication Union (ITU), including the G.711 waveform codec and the G.729 code-excited linear prediction (CELP) codec. Similarly, packetizer 114 can be any known signal packetizer. For example, packetizer 114 can produce information packets conforming to the well known Real-time Transport Protocol (RTP), in which each packet includes signal data in combination with a control header including, among other things, a packet sequence number.

Destination device 120 can be any known device capable of receiving a stream of information packets via a packet switching communication channel. For example, like source device 110, destination device 120 can be a personal computer, a mainframe computer, a network server, a dedicated audio/video device, a digital telephone, etc. Accordingly, destination device 120 can include components, such as depacketizer 122 and decoder 124, configured to recover an analog information signal (e.g., a voice signal, audio signal, video signal, etc.) from an encoded packet stream.

Depacketizer 122 can be any known signal depacketizer, and decoder 124 can be any useable signal decoder. For example, depacketizer 122 can be configured to process RTP information packets, and decoder 124 can be made compatible with codecs such as an ITU-specific codec.

Packet switching network 130, and thus packet switching nodes 132, can be configured to conform to any known type of packet switching technology. For example, network 130 and nodes 132 can conform to the well known X.25 packet switching protocol or to other protocols (ATM, IP, frame relay, etc.). Alternatively, network 130 and nodes 132 can conform to the equally well known Frame Relay protocol.

PLC processors 140 can be configured, as is described in detail hereinafter, to perform any useable type of packet loss concealment. Accordingly, each PLC processor 140 can include elements, such as PLC logic unit 142 and packet buffer 144, configured to assess packet loss and replace missing or corrupted packets based on knowledge of previously received packets and/or knowledge regarding operation of source device 110. In practice, PLC processors 140 can be implemented, in hardware and/or software, as stand-alone devices or as integrated devices (e.g., integrated within the hardware and/or software of a node 132 and/or destination device 120).

Exemplary Processing

In operation, source device 110 produces a stream of discrete information packets (e.g., a stream of packets encoded with voice, audio, video, etc.) for conveyance via packet switching network 130. Switching network 130 then transfers the packet stream, via nodes 132, to destination device 120. Destination device 120 in turn processes the packet stream in an attempt to recover the encoded information (e.g., for presentation to an end user of device 120).

Switching network 130 may apply well known routing techniques in conveying the packet stream from source device 110 to destination device 120. For example, in applications requiring real-time transfer of signals (e.g., Internet telephony and multimedia applications), network 130 can establish a virtual circuit, or virtual connection, between source device 110 and destination device 120. Such a virtual connection includes a chain of nodes 132 through which every packet in the encoded packet stream is routed. An exemplary virtual connection is depicted in the upper portion of FIG. 1 by way of a series of dashed lines connecting five of nodes 132 (labeled A through E in the figure) and in more detail in the lower portion of FIG. 1 designated "virtual connection".

In applications for which transfer speed is less critical, a virtual connection may not be necessary. In such case, each packet within the encoded stream can follow a different node path from source device 110 to destination device 120. If so, then destination device 120 collects the individual packets and reassembles and decodes the packet stream using well known techniques.

Whether individual packets traverse a common node path (e.g., a virtual connection), or multiple node paths, transmission of the encoded packet stream can include packet loss concealment, as indicated by a dashed box surrounding network 130 in FIG. 1. Whereas existing systems wait to apply loss concealment at a signal destination (a natural approach, given that packet losses are unpredictable and can occur anywhere within a packet switching network), exemplary system 100 begins loss concealment earlier in the communication process.

More specifically, system 100 employs a distributed loss concealment approach in which concealment techniques are applied, not only at a location following network 130 (e.g., at or just prior to destination device 120), but also at one or more intermediate locations within network 130. Advantageously, and as described in detail hereinafter with respect to FIG. 3, such a distributed approach can provide significant benefit in terms of end user signal perception.

Generally, system 100 can apply loss concealment at any point in network 130 through which consecutive packets in an encoded stream are routed. For example, system 100 can apply concealment at any node 132, or between any two nodes 132, in a virtual connection (i.e., since all packets in a stream are routed through a common path). Alternatively, for applications where virtual connections are not necessary, system 100 can apply concealment at hub sites (i.e., at or near any link or node, such as a gateway node, through which all packets in a stream are routed despite the fact that individual packets in the stream may otherwise traverse different paths).

At each location where loss concealment is to be applied, system 100 includes logic (i.e., hardware and/or software) configured to examine packet sequence numbers and generate substitute packets as necessary (e.g., whenever a packet fails to arrive at a loss concealment location in a timely fashion). According to the invention, loss concealment locations can be established prior to system operation (e.g., by designing-in concealment logic at appropriate points in network 130) and then selectively activated during system operation (e.g., based on source signal type and/or metrics indicative of prevailing network and traffic conditions).

FIG. 1 depicts an example of distributed packet loss concealment applied to the exemplary five-node virtual connection noted above. In the example, system 100 applies loss concealment following the second, fourth and fifth nodes of the virtual connection (i.e., following nodes 132 labeled B, D and E, respectively). Accordingly, a loss concealment processor 140 is shown to follow each of the second, fourth and fifth nodes 132 of the virtual connection. In practice, concealment processors 140 can be constructed as stand-alone devices or as integrated devices within respective nodes 132.

As shown in FIG. 1, each of loss concealment processors 140 can be viewed as providing loss concealment for a particular sub-network 135 of nodes 132, each sub-network 135 including at least one node 132. Such a perspective can aid understanding of certain benefits provided by exemplary system 100 (and by embodiments of the present invention generally) and is thus invoked hereinafter, in detailed descriptions of FIGS. 2 and 3, to illuminate such benefits.

Generally, each loss concealment processor 140 employs known concealment techniques to construct substitute packets (i.e., replacements for lost packets) based on original packets that arrive at the processor successfully. For example, within each processor 140, a packet buffer 144 can store copies of recently arrived packets (e.g., each buffer 144 can have a fixed packet depth, and copies of newly arriving packets can be pushed into the buffer while copies of older packets are pushed out of the buffer and into a packet sink), and a PLC logic unit 142 can process the stored copies to produce an appropriate substitute packet for each missing packet in a stream.

For example, a PLC logic unit 142 can replace a missing packet with a copy of the last original packet to be received correctly. Alternatively, a missing packet can be replaced with an estimate of the missing packet that is computed, for example, based on copies of previously received packets and/or knowledge of the signal source (e.g., knowledge of spectral characteristics). Those of ordinary skill in the art will appreciate that other loss concealment techniques can be used as well.

Moreover, if other components in system 100 (e.g., components within source device 110 and destination device 120) include loss concealment technology, then PLC logic units 142 can generate substitute packets conforming to that technology. For example, the above noted ITU G.729 voice codec, which can be used in certain embodiments to implement coder 112 and/or decoder 124, includes an integrated packet loss concealment method. Accordingly, in those certain embodiments, PLC logic units 142 can generate G.729-compatible substitute packets.

FIG. 2 depicts distributed packet loss concealment, according to the invention, in flow chart form. In FIG. 2, an exemplary packet transmission process 200 begins with a source signal being coded and packetized (e.g., by source device 110) to provide a stream of information packets (act 210). The information packets are then transmitted (e.g., via network 130) with packet loss concealment (act 220). Specifically, the packets are transmitted via an arbitrary number of sub-networks (e.g., sub-networks 135), and loss concealment is applied (e.g., by a PLC processor 140) following packet transmission through each sub-network (acts 222, 223, 224, 225, 228, 229). Subsequently, the transmitted packets are depacketized and decoded (e.g., by destination device 120) to recover an estimate of the original encoded signal (act 230). In a physical implementation, the various acts shown in FIG. 2 may implemented as a pipeline.

Advantages provided by the above described and other embodiments of the present invention can be seen in FIG. 3, in which a space-time diagram 300 depicts an exemplary stream of ten encoded packets, numbered sequentially from 1 to 10, traveling from source device 110 to destination device 120, via switching network 130. In the figure, three stars 311, 312, 313 indicate that three consecutive packets, numbered 5, 6 and 7, are lost at three different locations within network 130. More specifically, the packets numbered 5, 6 and 7 are shown to be lost within, respectively, third, second and first logical partitions of network 130 (e.g., the third, second and first sub-networks 135 depicted in FIG. 1).

According to the invention, intermediate loss concealment is applied at a location following each of the first, second and third logical partitions. Thus, loss concealment following the first logical partition can repair lost packet number 7 (as indicated by a square 321 in FIG. 3) using knowledge of packets numbered 1 through 6 (each of which is shown to pass successfully through the first logical partition). Similarly, loss concealment following the second logical partition can repair lost packet number 6 (as indicated by a second square 322 in FIG. 3) using knowledge of packets numbered 1 through 5 (each of which is shown to pass successfully through the first and second logical partitions), and loss concealment following the third logical partition can repair lost packet number 5 (as indicated by a third square 323 in FIG. 3) using knowledge of packets numbered 1 through 4 (each of which is shown to pass successfully through each of the first, second and third logical partitions).

By contrast, if loss concealment is applied only at destination device 120 (as indicated by three circles 331, 332, 333 in FIG. 3), then repair of lost packet number 7 cannot make use of packets numbered 5 and 6 (i.e., since packets 5 and 6 are lost prior to reaching destination device 120), and repair of lost packet number 6 cannot make use of packet number 5. Thus, distributed loss concealment according to the present invention can improve end-to-end perceptual performance as compared to prior art systems, inasmuch as original signal information is generally more available at intermediate points within network 130 than at destination device 120 (i.e., since packet losses that occur in later logical partitions are not seen at intermediate loss concealment points positioned after earlier logical partitions).

More generally, consider a packet stream including an arbitrary number, N, of information packets, numbered sequentially from 1 to N. Then, assuming the N packets are transmitted, in order, across a switching network that can be viewed as an arbitrary number, S, of sub-networks, a metric indicative of packet loss is easily defined. Specifically, let $\delta(n,s)=1$, if a particular packet n is lost or discarded in a particular sub-network s, and let $\delta(n,s)=0$ otherwise.

Then, for any given packet m lost in a particular sub-network s, loss concealment applied at an intermediate point following sub-network s, and preceding sub-network s+1, can construct a substitute packet based on all previous packets that arrive successfully at the intermediate point (i.e., based on all packets n such that $1 \leq n < m$ and $\delta(n,i)=0$ for all $i=1$ to s). By contrast, concealment applied only at signal destination must construct a substitute packet based solely on previous packets that successfully traverse the entire network (i.e., based on all packets n such that $1 \leq n < m$ and $\delta(n,i)=0$ for all $i=1$ to S).

Thus, intermediate loss concealment according to the invention employs at least as much information in repairing a lost packet than does existing loss concealment (i.e., since s is, by definition, less than or equal to S in the equations of the preceding paragraph). In practice, systems constructed in accordance with the invention will generally, as compared to conventional systems, apply more original signal information in repairing lost packets, and will thus provide improved quality of transmitted signals as compared to conventional systems.

CONCLUSION

Systems and methods consistent with the present invention employ distributed packet loss concealment, whereby loss concealment techniques are applied at one or more intermediate points in a packet switching network and at a point following the packet switching network. Consequently, embodiments of the present invention use more original signal information in repairing missing signal segments than do conventional destination-only concealment schemes. Accordingly, implementations consistent with the present invention can provide improved quality of signal perception as compared with prior art loss concealment schemes.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. While series of acts have been described with regard to certain of the figures, the order of the acts can be varied in other implementations consistent with the present invention, and non-dependent acts can be implemented in parallel.

No element, act, or instruction used in the description of the present invention should be construed as critical or essential to the invention unless explicitly described as such. As used herein, the article "a" is intended to include one or more items. Where only one item is intended, the term "one" or similar language is used.

The scope of the invention is not limited to the foregoing description, and is instead defined by the appended claims and their equivalents.

What is claimed is:

1. A communications system, comprising:
a plurality of packet switching nodes, located within a packet switching network, to receive, from a source, a plurality of information packets directed to a destination, where each of the plurality of packet switching nodes includes:
at least one packet loss concealment processor to:
receive a respective subset of the plurality of information packets, where the subset includes two or more consecutive information packets of the plurality of information packets, and
perform packet loss concealment on the received two or more consecutive information packets as the two or more consecutive information packets pass through a packet switch node of the plurality of packet switching nodes, where, when performing the packet loss concealment, the at least one packet loss concealment processor is further to:
determine that the received two or more consecutive information packets include a lost information packet, determine a substitute information packet, for the lost information packet, based on contents of previously received information packets and on information associated with the source, where the information associated with the source includes one or more spectral characteristics of a transmission, from the source, carrying the received two or more consecutive information packets, and
replace the lost information packet with the determined substitute information packet.

2. The communications system of claim 1, where the packet switching network includes:
a plurality of sub-networks logically partitioned from the packet switching network to form a virtual connection between the source and the destination,
where each of the plurality of packet switching nodes connects to one of the plurality of sub-networks, and where the associated at least one packet loss concealment processor is further to perform packet loss concealment on the plurality of information packets passing from the one of the plurality of sub-networks to another one of the plurality of sub-networks.

3. The communications system of claim 2,
where the plurality of information packets passes from the source, through a succession of the plurality of sub-networks and the plurality of packet switching nodes, toward the destination, and
where packet loss concealment is applied by the plurality of packet switching nodes, to the plurality of information packets, as the plurality of information packets exits respective ones of the plurality of sub-networks.

4. The communications system of claim 1, where, when determining the substitute information packet, the at least one packet loss concealment processor uses a copy of a last original information packet, from the plurality of information packets, correctly received by the at least one packet loss concealment processor.

5. The communications system of claim 1, where, for each of the plurality of packet switching nodes, at least one packet loss concealment processor includes a stand-alone processor provided externally to the plurality of packet switching nodes of the packet switching network.

6. The communications system of claim 1, where, for each of the plurality of packet switching nodes, at least one packet loss concealment processor includes an integrated processor provided internally to the corresponding plurality of packet switching nodes of the packet switching network.

7. The communications system of claim 1, where the packet switching network employs an X.25 packet switching protocol.

8. The communications system of claim 1, where the packet switching network employs a Frame Relay packet switching protocol.

9. The communications system of claim 1, where the plurality of information packets includes at least one of:
an encoded voice signal,
an encoded audio signal, or
an encoded video signal.

10. The communications system of claim 1, where the plurality of information packets includes at least one of:
- a waveform encoded voice signal, or
- a code-excited linear predictive encoded voice signal.

11. A method of communicating information from a source to a destination, via a packet switching network, the method comprising:
- receiving, from the source, a two or more consecutive information packets, of a plurality of information packets transferred between the source and the destination, at each of a plurality of intermediate nodes provided within the packet switching network; and
- performing, via each of the plurality of intermediate nodes, packet loss concealment on the received two or more consecutive information packets to form intermediate information packets, where the performing the packet loss concealment includes:
  - determining that the received two or more consecutive information packets include a lost information packet,
  - determining a substitute information packet, for the lost information packet, based on contents of previously received information packets and on information associated with the source, where the information associated with the source includes one or more spectral characteristics of a transmission, from the source, carrying the information packets, and
  - replacing the lost information packet with the determined substitute information packet; and
- transmitting, via the intermediate node, the intermediate information packets toward the destination.

12. The method of claim 11, where transmitting the intermediate information packets to the destination includes:
- transmitting the intermediate information packets via another intermediate node provided within the packet switching network; and
- performing, via the other intermediate node, packet loss concealment on the intermediate information packets.

13. The method of claim 11, where the information packets include at least one of:
- an encoded voice signal,
- an encoded audio signal, or
- an encoded video signal.

14. A system comprising:
- a plurality of packet switching nodes located in a packet switching network provided between a source and destination, each of the plurality of packet switching nodes comprising:
  - an input interface that receives a respective set of consecutive information packets from the source;
  - an output interface that selectively transmits the received set of consecutive information packets toward the destination; and
  - a packet loss concealment processor that performs packet loss concealment on the received set of consecutive information packets as the received set of consecutive information packets pass through a packet switching node of the plurality of packet switching nodes, where, when performing the packet loss concealment, the packet loss concealment processor is further to:
    - determine that the received set of consecutive information packets include a lost information packet,
    - determine a substitute information packet, for the lost information packet, based on copies contents of previously received information packets and on information associated with the source, where the information associated with the source includes one or more spectral characteristics of a transmission, from the source, carrying the information packets, and
    - replace, in the received set of consecutive information packets, the lost information packet with the determined substitute information packet.

15. The system of claim 14, where the source and the destination include one or more of:
- voice devices,
- audio devices,
- video devices, or
- packet switching nodes.

16. The system of claim 14, where the packet loss concealment processor, associated with one of the plurality of the plurality of packet switching nodes, selectively applies the packet loss concealment to the respective received set of consecutive information packets.

17. A system comprising:
- a plurality of communications devices, each of the plurality of communications devices comprising:
  - means for receiving two or more consecutive information packets, of a plurality of information packets from a source device; and
  - means for performing packet loss concealment on the two or more consecutive information packets as the two or more consecutive information packets pass through a communications device of the plurality of communication devices, where the means for performing packet loss concealment includes:
    - means for determining that the two or more consecutive information packets include a lost information packet,
    - means for determining a substitute information packet, for the lost information packet, based on contents of previously received information packets and on information associated with the source device, where the information associated with the source device includes one or more spectral characteristics of a transmission, from the source device, carrying the information packets, and
    - means for replacing the lost information packet with the determined substitute information packet.

18. A non-transitory computer readable medium including a plurality of instructions that, when executed by components in a communications device, cause the communications device to perform distributed packet loss concealment, the computer readable medium comprising:
- instructions for receiving two or more consecutive information packets, of a stream of information packets, from a source device; and
- instructions for performing packet loss concealment on the two or more consecutive information packets as the two or more consecutive information packets pass through the communications device, where the instructions for performing packet loss concealment include:
  - instructions for determining that the two or more consecutive information packets include a lost information packet,
  - instructions for determining a substitute information packet, for the lost information packet, based on contents of previously received information packets and on information associated with the source device, where the information associated with the source device includes one or more spectral characteristics of a transmission, from the source device, carrying the information packets, and
  - instructions for replacing the lost information packet with the determined substitute information packet.

* * * * *